Patented July 11, 1939

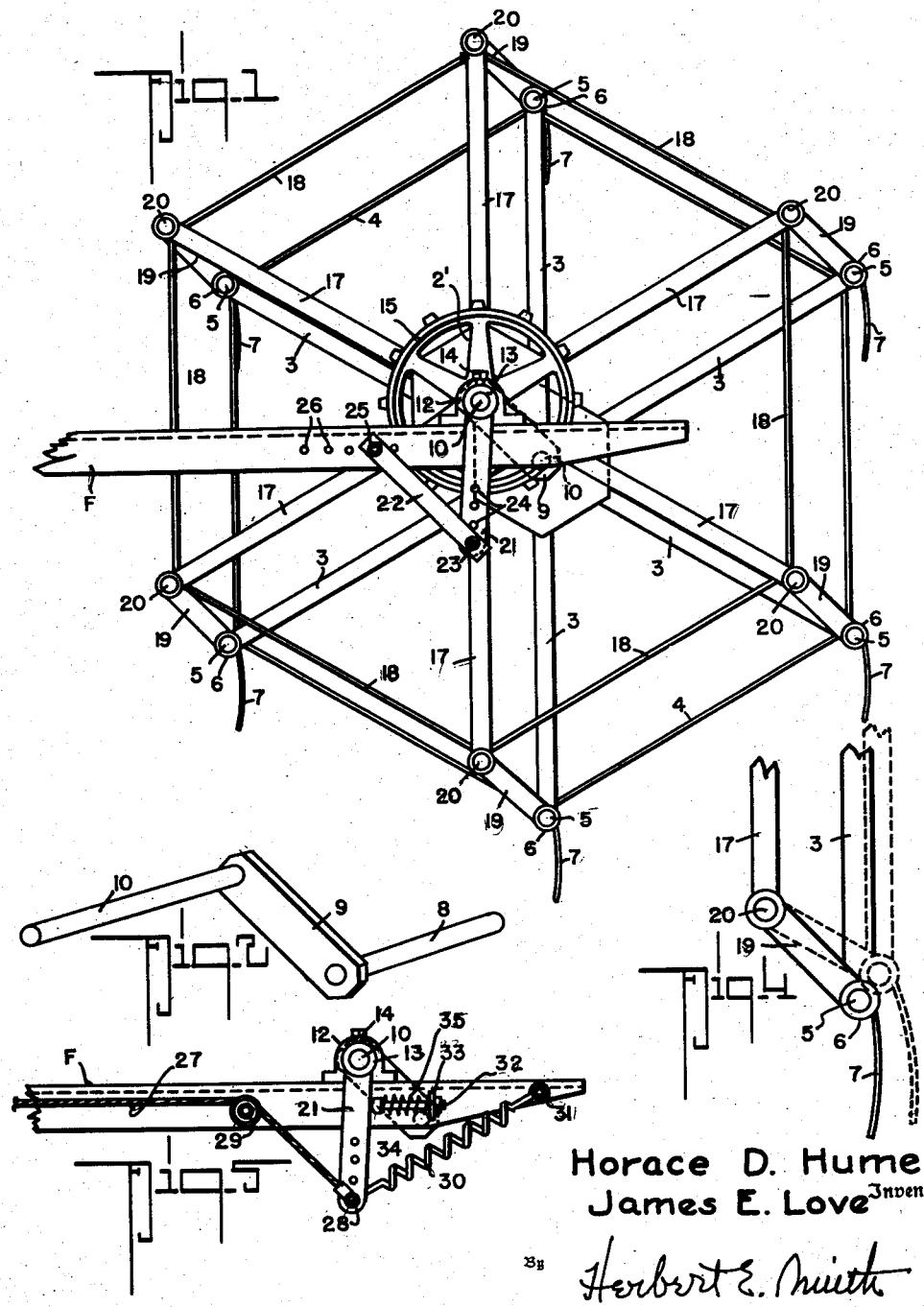

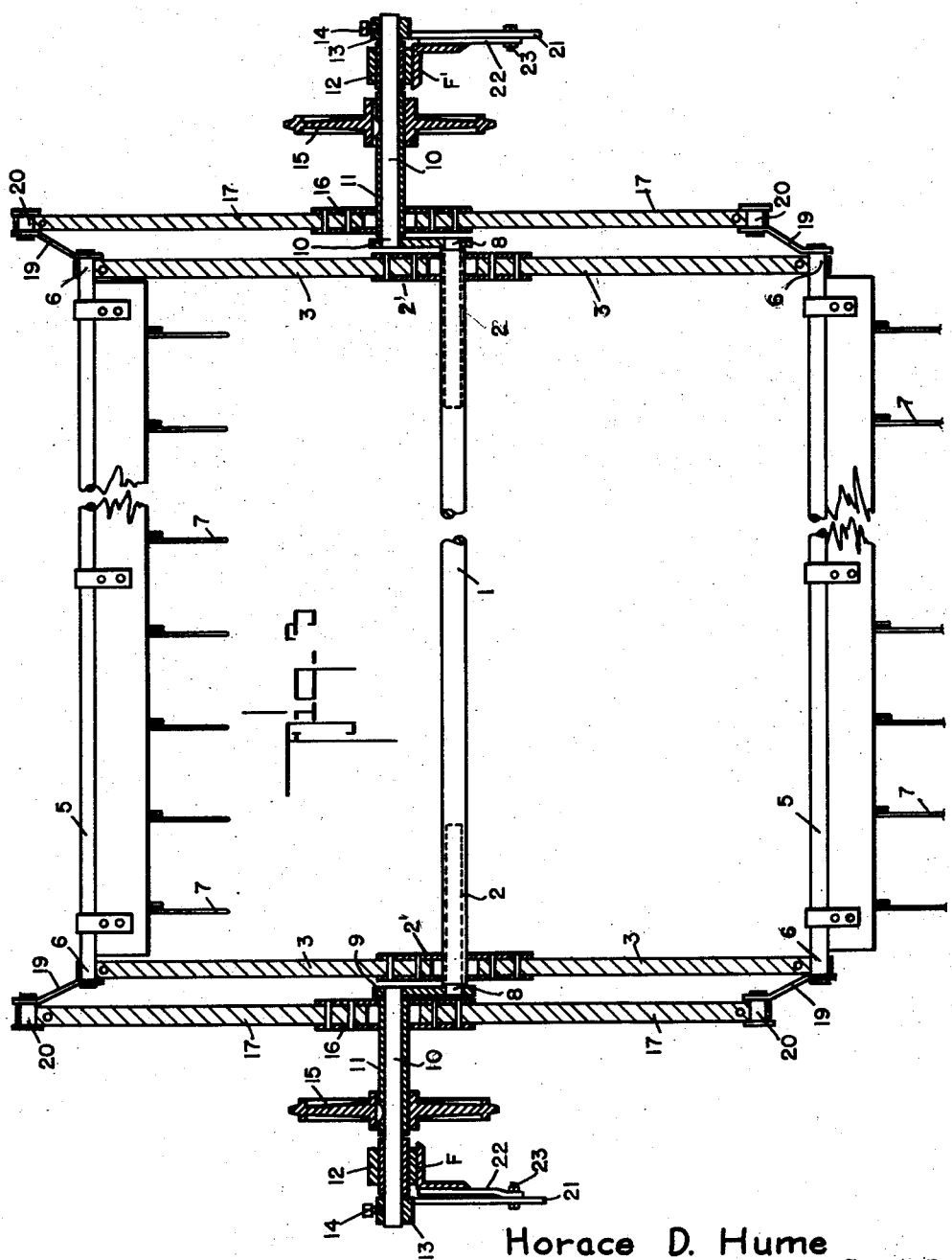

2,165,381

UNITED STATES PATENT OFFICE 2,165,381

ROTARY REEL

Horace D. Hume and James E. Love, Garfield, Wash.

Application April 15, 1938, Serial No. 202,292

12 Claims. (Cl. 56—226)

Our present invention relates to improvements in rotary reels employed on harvesting machines, in connection with reciprocating cutters of the sickle type, to gather or pick up the crop, transfer it to the sickle, and then lift and pass the cut crop to the usual draper or carrier which disposes of the crop in suitable manner.

The rotary reel is of the type which embodies a supplemental movement in addition to its usual rotary movement, and the tines mounted on the reel are also given a supplemental or feathering movement, to enhance the efficiency of the reel in the performance of its functions.

But the utilization of the supplemental movement in both the reel and the tines, the successive rearwardly descending tines are caused to dip into the crop, pick up the grain, or vines and pass them to the sickle, and then as the successive rows of tines ascend rearwardly they lift and pass the cut crop to the draper or carrier.

Our invention is especially designed for use with an embodiment in heavy-duty or large capacity harvesters in which a comparatively long sickle or cutter is employed and therefore a correspondingly long reel is required, and means are provided for mounting or supporting the reel in stable position in relation to the sickle in order that the entire length of the reel is available for effective work. Means are also provided for driving or operating the reel and its tines to insure smooth working of the parts, equal distribution of the required power, and a balanced absorption of strains and stresses usually imparted to the reel.

In carrying out our invention we provide duplex, adjustable mounts for the reel, and duplex driving mechanism for the reel, to compensate for the unusual length of the rotary reel, and to insure smooth and efficient operation of the parts. The reel is adjustable in its duplex mounts to meet varying conditions in the crop field, whereby it is effective in gathering low, fallen, lodged or tangled grains; and the reel may also be easily be adjusted for harvesting seed crops such as peas, beans, alfalfa, clover, and other similar close to the ground crops.

Our invention consists in certain novel combinations and arrangements of parts as will hereinafter be more fully set forth and claimed. In the accompanying drawings we have illustrated one complete example of the physical embodiment of our invention wherein the parts are combined and arranged according to one mode we have thus far devised for the practical application of the principles of our invention. It will be understood that changes and alterations may be made in the exemplifying structures, within the scope of our claims, without departing from the principles of our invention.

Figure 1 is an end view showing in elevation the outer end of the rotary reel, together with its auxiliary operating head, the mount for the reel, and the adjusting means for the supplemental movement of the tines.

Figure 2 is a perspective view of one of the duplex journal bearing mounts for the reel.

Figure 3 is a vertical longitudinal sectional view of the reel, broken away for convenience of illustration, and showing also its duplex mounts and duplex driving mechanism.

Figure 4 is a detail view, showing by dotted lines, the range of adjustment of the feathering tines.

Figure 5 is a slightly modified form showing remote control for the tine-adjusting means, and a resilient feature embodied in the action of the feathering tines.

The rotary reel comprises a central shaft 1 that extends transversely of the direction of travel of the harvester, and the ends of this shaft are provided with tubular portions 2, 2, that form journal bearings for the rotary reel. Two spaced heads are rigidly mounted on the ends of the shaft, each head comprising a hub 2', radial spokes 3, and the polygonal shape frame 4, and a suitable number of longitudinally extending tine-bars 5 are journaled at their ends 6 in the spaced heads. The tines 7, arranged in rows, are mounted on the tine-bars, and these bars are rocked or turned as the reel revolves, so that the tines have a supplemental movement that maintains them in the vertical positions of Figure 1 regardless of the location of the tines with relation to ground surface.

The comparatively long reel is provided at its opposite ends with duplex mounts or journal bearings, and duplex driving means, and for this purpose we employ duplex crank axles, one of which is best shown in Figure 2, as comprising an inner journal 8, a radial arm 9 and a stub-axle 10. The tubular bearing ends 2, 2, of the reel shaft are journaled on the journals 8, 8, and through these mounts the reel is supported to rotate or revolve in spaced parallel frame members F and F' which project forwardly from the harvester in the direction of travel of the implement.

For operating the reel and for imparting the supplemental movement to the reel and also to its tines we employ duplex driving mechanism, one at each end of the reel, and each drive includes a drive sleeve 11 journaled on the stub axle 10 and mounted in journal bearings 12 that are supported on the frame members or angle bars F, F', and an end collar 13 is fixed by set bolt 14 on the extreme end of each stub axle.

The driving sleeves are revolved through the use of sprocket wheels 15, rigidly mounted thereon, and drive chains (not shown) operated from a suitable power device of the harvester.

Two auxiliary, rotary, operating heads are fixed on the sleeves of the mounts, exterior of the spaced reel-heads, and each of these auxiliary operating heads comprises a spider frame composed of a hub 16 fixed to a sleeve 11, spokes 17 fixed to the hub, and a series of rods 18 that connect the outer ends of the adjoining spokes 17.

As best seen in Figure 4, the auxiliary heads are connected with the reel heads through the use of arms or links 19 pivoted at 20 on the auxiliary heads, and these links are also pivotally connected at 6 with the tine bars 5.

Through this arrangement between the auxiliary operating heads and the heads of the reel, the latter is rotated on its journals 8, 8 and a supplemental movement is imparted to the rows of tines through the action of the links 19 and the tine bars 5.

In Figure 1 means are illustrated for adjusting the duplex mounts or crank axles that support the opposite ends of the reel for the purpose of varying the set of the tines, i. e., to swing the points of the tines forward of their vertical position in Figure 1, or rearward of that position, in order to meet varying conditions in the crops to be gathered, or to adapt the reel to irregularities in the ground-surface of the harvest fields.

This adjustment or setting of the tines is accomplished by the use of a lever arm 21 rigid with the collar 13 that is fixed on the stub axle 10, and a locking arm 22 that is bolted at 23 in one of a selected series of holes 24 in the lever arm. By swinging the lever arm the stub axle 10 may be turned on its center and the journal 8 is thereby swung through an arc with the stub axle as a center, and of course the reel moves with the two journals. When the reel is thus adjusted with relation to the auxiliary heads, the locking arm 22 is fixed by a bolt 25 in one of a series of holes 26 in the frame member F.

In the modified adjusting mechanism in Figure 5 the setting of the tines may with facility and dispatch be accomplished by one of the operators of the harvester without necessity for leaving his station at the rear of the reel, and a pull cable 27 is used in lieu of the locking arm 22. This cable at its front end is attached or bolted at 28 to the lever arm 21, and the cable passes over a guide pulley 29, journalled on the frame F, back to a position where it is readily accessible to the operator, who, through a pull on the cable, may swing the mounts and reel for the adjustment, and of course the rear end of the cable is anchored or fastened to a suitable support. The pull on the cable is against the tension of a spring 30 that is anchored to the lever arm at 28 and also anchored at the forward end of the frame member F at 31, and the cable and spring, at opposite sides of the lever arm, hold the tines in their adjusted or set position.

By this remote, manual control, through the use of the cable, the setting of the tines may be changed or adjusted while the harvester is progressing or advancing with its work, and no time is lost in the operation of the harvester.

To insure against displacement of the tines from their desired adjustment, due to slackness that might occur in the pull cable 27, we provide a spring buffer that is opposed to the action of the spring 30; and this spring buffer, together with the spring 30, also provides the mount with a resiliency that is effective in preventing damage to the tines or the reel when the tines encounter obstructions or irregularities in the field. The spring buffer comprises a bolt 32 mounted in a bracket 33 fixed to the frame member F, and the head 34 of the bolt bears against the lever arm 21. A spring 35 is coiled about the bolt and interposed between its head and the bracket, and the spring urges the bolt against the lever arm, the pressure being applied to the lever arm with a tendency to swing the arm in direction opposite to the pull of the compression spring 30.

Having thus fully described our invention, what we claim as new and desire to secure by Letters Patent is:

1. The combination in a rotary reel having tines capable of a supplemental movement, with a pair of spaced crank-axles on which the reel is journaled, and spaced frame members, of driving-sleeves mounted on said crank-axles and bearings in the frame members for said sleeves, means for rotating the sleeves, and means actuated by the sleeves for causing supplemental movement of the tines.

2. The combination in a rotary reel having tines capable of a supplemental movement, with a pair of spaced crank axles on which the reel is journaled, and spaced frame members, of means for revolving the reel, bearing supports in the frame for said means, and transmission mechanism operated by said means for causing supplemental movement of the tines.

3. The combination in a rotary reel having tines capable of a supplemental movement, with spaced frame members, duplex mounts on which the rotary reel is journaled, and means for supporting said mounts in the frame members, of driving mechanism for revolving the reel, and power transmission mechanism operated by the driving mechanism for causing supplemental movement of the tines.

4. The combination in a rotary reel having tines capable of supplemental movement, with spaced frame members, duplex mounts on which the reel is journaled, and means for supporting the mounts in the frame members, of driving mechanism for revolving the reel, power transmission mechanism operated by the driving mechanism to cause supplemental movement of the tines, and means for adjusting the transmission mechanism to vary the set of the tines.

5. The combination with a pair of spaced frame members, a pair of driving sleeves and journal bearings on said members for the sleeves, a pair of crank axles mounted in said sleeves, a rotary reel journaled on said crank axles, and tines mounted on said reel for supplemental movement, of means mounted on the sleeves for transmitting rotary movement to the reel and supplemental movement to the tines.

6. The combination with a pair of spaced frame members, a pair of driving-sleeves journaled on said members, a pair of crank axles mounted in said sleeves, a rotary reel journaled on the crank axles, and tines mounted on the reel for supplemental movement, of operating means mounted on the sleeves for transmitting rotary movement to the reel and supplemental movement to the tines, and means for adjusting the operating means to vary the set of the tines.

7. In an adjustable mount for a rotary reel, the combination with a driving sleeve and a bearing support therefor, a crank-axle mounted in the sleeve, and a reel journaled on the crank axle, of means for oscillating the crank-axle in its sleeve to adjust the position of the reel, and means for retaining the crank axle in adjusted position.

8. In an adjustable mount for a rotary reel, the combination with a driving sleeve and a bearing-support therefor, and a crank-axle mounted in the sleeve, of means for oscillating the crank axle in the sleeve to adjusted position, and resilient means for retaining the crank-axle in adjusted position.

9. The combination in a rotary reel, with spaced frame members, duplex mounts on which the reel is mounted to revolve, and duplex driving mechanism for the reel, of means for adjusting the duplex mounts to vary the position of the reel with relation to the ground surface, and means for retaining said mounts in adjusted position.

10. The combination with a pair of spaced frame members, a pair of driving sleeves journaled in said members, and a pair of crank axles mounted in said sleeve, and a rotary reel journaled on said crank-axles, of power transmitting means between said sleeves and the reel, means for adjusting the crank axles to vary the position of the reel with relation to the ground surface, and means for retaining said crank-axles in adjusted position.

11. The combination with a pair of spaced frame members, a pair of driving sleeves journaled in said members, a pair of crank axles mounted in the sleeves, and a rotary reel journaled on said crank axles, of an operating head rigid with each driving sleeve, operative connections between said heads and the rotary reel, means for adjusting the crank axles to vary the position of the reel with relation to the ground surface, and means for retaining said crank-axles in adjusted position.

12. The combination with a pair of spaced frame members, a pair of driving sleeves journaled in said members, an operating head rigid with each sleeve, a rotary reel journaled between said heads, and a pair of crank-axles mounted in said sleeves on which said reel is journaled, of power transmitting means between said heads and the reel, means for adjusting the crank axles in their sleeves, and resilient means for retaining the crank-axles in adjusted position.

HORACE D. HUME.
JAMES E. LOVE.